United States Patent
Yonezawa et al.

(10) Patent No.: US 10,082,160 B2
(45) Date of Patent: Sep. 25, 2018

(54) MAGNET-TYPE RODLESS CYLINDER

(71) Applicant: HOWA MACHINERY, LTD., Kiyosu-shi, Aichi (JP)

(72) Inventors: Tsuyoshi Yonezawa, Kiyosu (JP); Yoshimi Moriyama, Kiyosu (JP)

(73) Assignee: HOWA MACHINERY LTD., Aichi (JP)

( * ) Notice: Subject to any disclaimer, the term of this patent is extended or adjusted under 35 U.S.C. 154(b) by 430 days.

(21) Appl. No.: 14/424,267

(22) PCT Filed: Aug. 8, 2013

(86) PCT No.: PCT/JP2013/071560
§ 371 (c)(1),
(2) Date: Feb. 26, 2015

(87) PCT Pub. No.: WO2014/034408
PCT Pub. Date: Mar. 6, 2014

(65) Prior Publication Data
US 2015/0219125 A1 Aug. 6, 2015

(30) Foreign Application Priority Data

Aug. 27, 2012 (JP) ................................. 2012-186718

(51) Int. Cl.
*F15B 15/08* (2006.01)
*F16C 29/00* (2006.01)
(Continued)

(52) U.S. Cl.
CPC ........ *F15B 15/086* (2013.01); *F15B 15/1471* (2013.01); *F16C 29/007* (2013.01);
(Continued)

(58) Field of Classification Search
CPC .................................................. F15B 15/086
(Continued)

(56) References Cited

U.S. PATENT DOCUMENTS

| | | | | |
|---|---|---|---|---|
| 5,568,982 A | * | 10/1996 | Stoll | B23Q 1/58 384/45 |
| 6,832,541 B2 | * | 12/2004 | Satou | F15B 15/1471 92/88 |
| 2001/0015580 A1 | * | 8/2001 | Sato | F15B 15/086 310/83 |

FOREIGN PATENT DOCUMENTS

| | | |
|---|---|---|
| JP | 1-82330 | 6/1989 |
| JP | H06-20896 Y2 * | 6/1994 |

(Continued)

OTHER PUBLICATIONS

JPH10318209A machine translation to English from JPO AIPN. 1998.*

(Continued)

*Primary Examiner* — Thomas E Lazo
*Assistant Examiner* — Michael Quandt
(74) *Attorney, Agent, or Firm* — Finnegan, Henderson, Farabow, Garrett & Dunner, LLP

(57) ABSTRACT

A magnet-type rodless cylinder (1) is provided with a guide mechanism having an outer rolling groove (26), an inner rolling groove (29), a cylinder body (32), a pair of connection paths (34) for connecting an area between the outer rolling groove and the inner rolling groove with the cylinder body, and a plurality of steel balls (36) that can roll within an endless circuit (35) formed of the cylinder body, the connection paths and the area between the outer rolling groove and the inner rolling groove, wherein the connection paths (34) are formed at a pair of inner members, i.e. return caps (33), disposed on the inner sides of metal end plates (12) that are attached to the front and rear ends in the sliding direction of a sliding body (4).

1 Claim, 5 Drawing Sheets

(51) Int. Cl.
    *F16C 29/06*         (2006.01)
    *F16C 32/04*         (2006.01)
    *F15B 15/14*         (2006.01)
    *F16J 1/10*           (2006.01)
    *F16J 10/02*         (2006.01)

(52) U.S. Cl.
    CPC ........ *F16C 29/063* (2013.01); *F16C 29/0609* (2013.01); *F16C 32/0434* (2013.01); *F16J 1/10* (2013.01); *F16J 10/02* (2013.01)

(58) Field of Classification Search
    USPC .......................................................... 92/88
    See application file for complete search history.

(56) References Cited

FOREIGN PATENT DOCUMENTS

| | | |
|---|---|---|
| JP | 10-318209 | 12/1998 |
| JP | 3767648 | 4/2006 |
| JP | 2011-099501 | 5/2011 |
| TW | M310272 | 4/2007 |

OTHER PUBLICATIONS

JPH0620896Y2 machine translation to English from JPO AIPN. 1994.*

Office Action in counterpart Taiwan Patent Application No. 10420456360 dated Apr. 14, 2015.

English-language International Search Report from the Japanese Patent Office for International Application No. PCT/JP2013/071560, dated Oct. 8, 2013.

* cited by examiner

FIG. 4
(a)
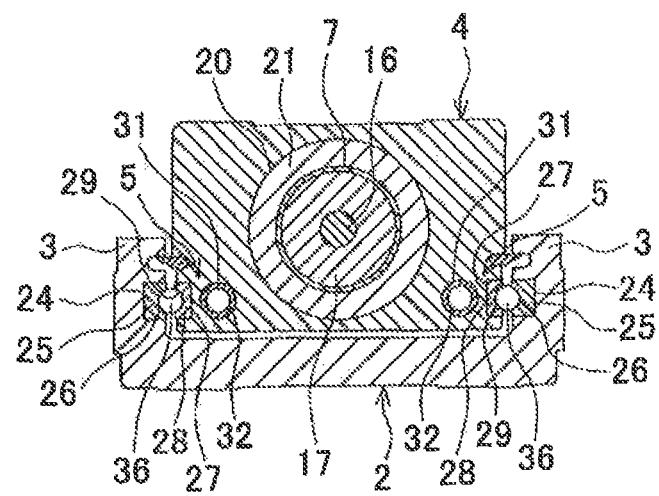
(b)
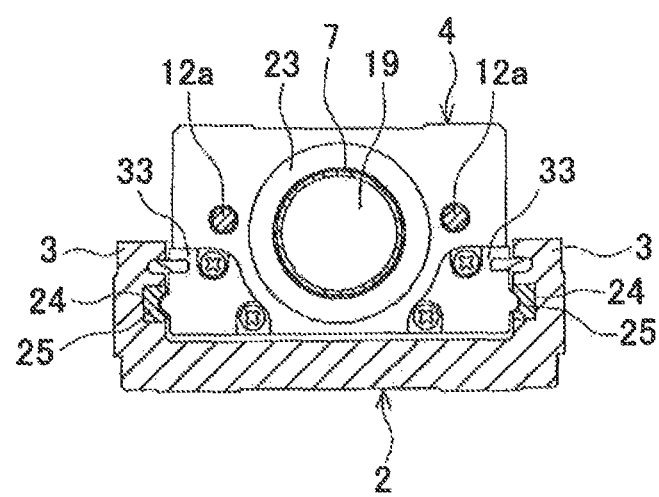
(c)
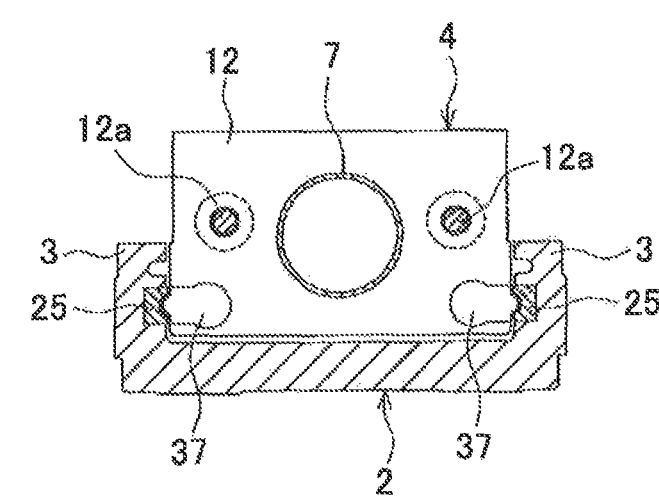

MAGNET-TYPE RODLESS CYLINDER

TECHNICAL FIELD

The present invention relates to a magnet-type rodless cylinder comprising a base with a U-shaped cross-section which is provided with a left and right air of side wall parts, a cylinder tube which holds a piston which is provided parallel to side wall parts inside it, a slide member which can slide along the cylinder tube at an outer circumferential surface of the cylinder tube, the piston and side member being integrally joined by a magnetic coupling force and the slide member being able to move tracking movement of the piston, and guide mechanisms which are provided between the side wall parts and the slide member.

BACKGROUND ART

Known in the art is a magnet-type rodless cylinder which is provided with a base with a U-shaped cross-section which is provided with a left and right pair of side wall parts, a pair of end caps which are provided at the two ends of the base, a cylinder tube which holds a piston to be able to move back and forth in the axial direction and which is provided parallel to the side wall parts between the same, and a slide member which is passed over the cylinder tube and which is arranged between the side wall parts of the base, the piston and the slide member being magnetically coupled. Accordingly, if supplying the inside of the cylinder tube with compressed air or other fluid to make the piston move inside of the cylinder tube, the slide member can move integrally with the piston.

In such a magnet-type rodless cylinder, guide mechanisms are given for guiding the slide member with respect to the cylinder tube with a high precision. As such guide mechanisms, for example, PLT 1 discloses structures which provide inside load ball-use guide grooves at the two side surfaces of a driven table (slide member) and outside load ball-use guide grooves at inside surfaces of guide rails (base), which provide no-load ball-use guide bores at the inside of the slide member, which provide circulating paths which connect the inside load ball-use guide grooves and no-load ball-use guide bores at end caps which are fastened to the two end faces of the slide member, and which hold ball-shaped rollers at endless circulating paths which are comprised of these guide grooves, guide bores, and circulating paths.

CITATIONS LIST

Patent Literature

PLT 1: Japanese Patent No 3767648

SUMMARY OF INVENTION

Technical Problem

However, in the above conventional guide mechanisms, circulating paths which form endless circulating paths are directly formed at the plastic end caps of the slide member. At the end caps, reamer bolts are screwed into the locations which abut against shock absorbers at the stroke ends. Accordingly, the total length of the slide member becomes longer and conversely the stroke ends up being limited. Further, to form internal threads for the reamer bolts to be screwed into, it is necessary to enlarge the width direction of the slide member. Further, it is necessary to arrange shock absorbers at the end sides of the end caps so as to correspond to the reamer bolts. There is therefore the problem of the magnet-type rodless cylinder becoming larger in size. Further, if removing the end caps for maintenance of the piston, scraper, etc, inside the slide member, the steel balls are liable to fall out from the circulating paths, so the work becomes troublesome. Furthermore, there is no place for attaching members which lubricate the grooves in which the rollers roll at the end caps. Accordingly, to provide these members, it is necessary to provide attachment members to the outsides of the end caps. There is therefore the problem that the total length of the slide member becomes longer.

Therefore, the present invention has as its object the provision of a magnet-type rodless cylinder which has a longer total length of a slide member and is free of restrictions on its stroke and which can be made smaller overall and can be easily maintained.

Solution to Problem

To achieve the above object, one aspect according to the present invention provides a magnet-type rodless cylinder comprising a base with a U-shaped cross-section which is provided with a left and right pair of side wall parts, a cylinder tube which holds a piston, which cylinder tube is provided in the base parallel to side wall parts of the base, a slide member which can slide along the cylinder tube and is provided at an outer circumferential surface of the cylinder tube, which slide member is integrally joined with the piston by a magnetic coupling force and can move tracking movement of the piston, and guide mechanisms for the slide member which are provided between the pair of side wall parts and the slide member, wherein each of the guide mechanisms includes an outside rolling groove which is provided in the side wall part and which is parallel with the cylinder tube, an inside rolling groove which is provided in the slide member facing the outside rolling groove, a guide path which is parallel with the cylinder tube and provided at the slide member, a U-shaped pair of connecting paths which connect the space between the outside rolling groove and the inside rolling groove and the guide path, and a plurality of rollers which can roll inside an endless circulating path which is formed by the space between the outside rolling groove and the inside rolling groove, the guide path, and the connecting paths, and wherein the connecting paths are formed with a pair of inside members which are arranged at insides of metal end plates which are attached to the front and back ends of the slide member in the slide direction. In the present invention, lubricating members which lubricate the outside rolling grooves may be attached to the end plates.

Advantageous Effects of Invention

According to the invention according to claim 1, metal end plates are attached to the front and back ends of the slide member in the slide direction. At the insides of the end plates, inside members which form connecting paths are arranged and end plates are made to directly abut against the shock absorbers etc. at the stroke ends, so the total length of the slide member becomes shorter compared with the past. Further, it is not necessary to arrange shock absorbers at the end sides of the end caps so as to correspond to the bolt members attaching the end plates to the slide member, so the magnet-type rodless cylinder as a whole becomes smaller in size. Further, at the time of maintenance work on the inside of the slide member, even if detaching the end plates, the rollers will not fall out from the circulating paths and the maintenance of the piston, scraper, etc. can be easily performed. According to the invention according to claim 2, in addition to the effect of claim 1, it is possible to attach lubricating members which lubricate the outside rolling grooves at the end plates, so the total length of the slide member does not become longer.

BRIEF DESCRIPTION OF DRAWINGS

FIG. 4(a) is a cross-sectional view along the line A-A of FIG. 2, (b) is a cross-sectional view along the line B-B of FIG. 2, and (c) is a cross-sectional view along the line CC of FIG. 2.

DESCRIPTION OF EMBODIMENTS

Figure 1:
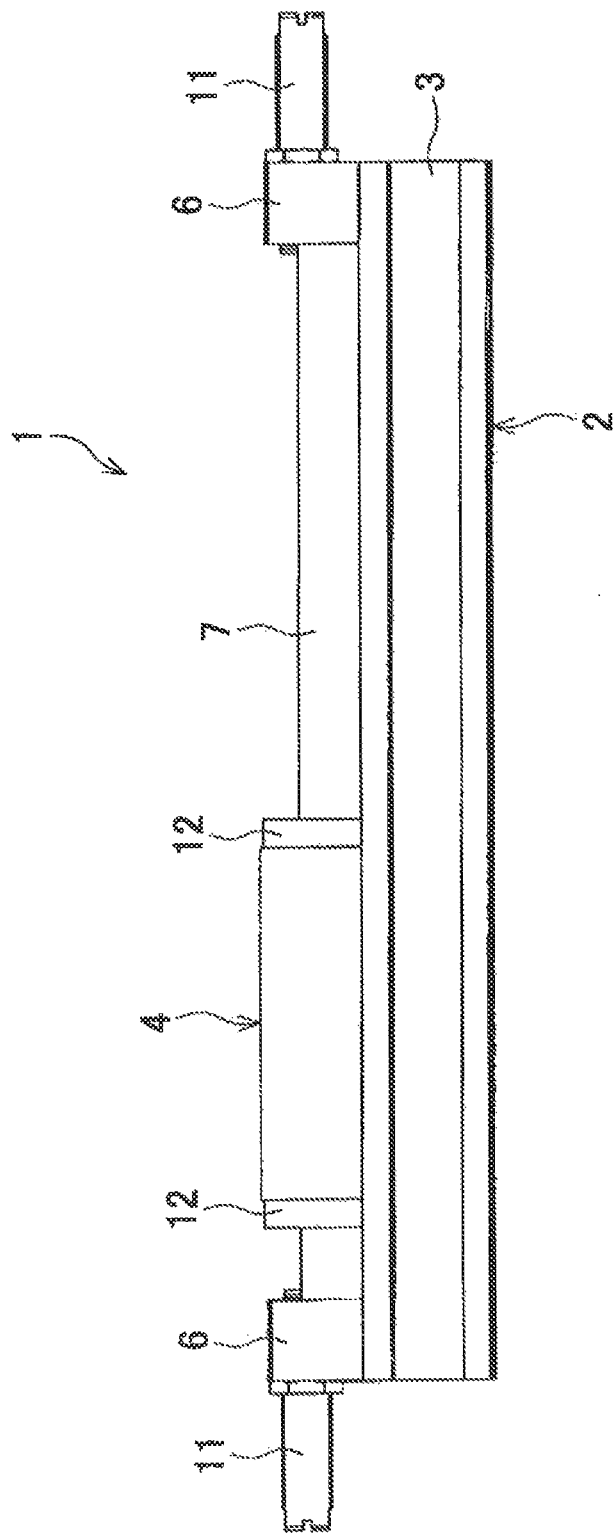
FIG. 1 is a front view of a magnet-type rodless cylinder.
Figure 2:
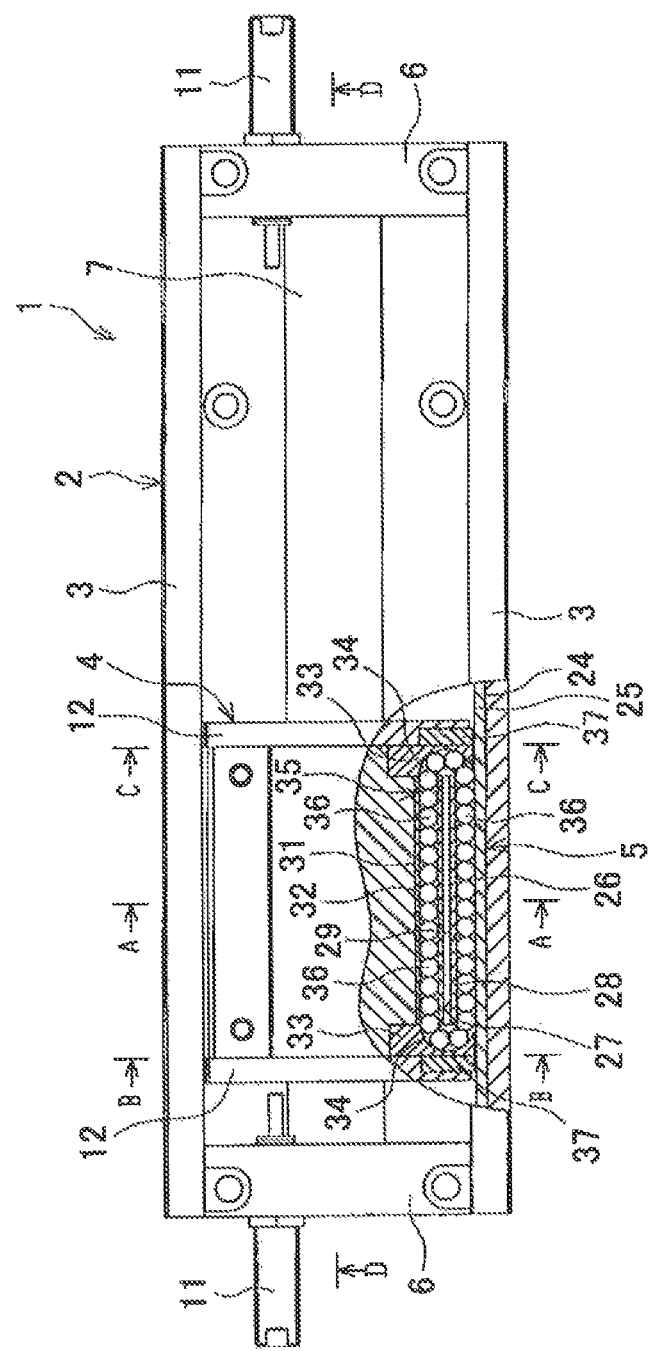
FIG. 2 is a plan view which shows part of a magnet-type rodless cylinder in cross-section.
Figure 3:
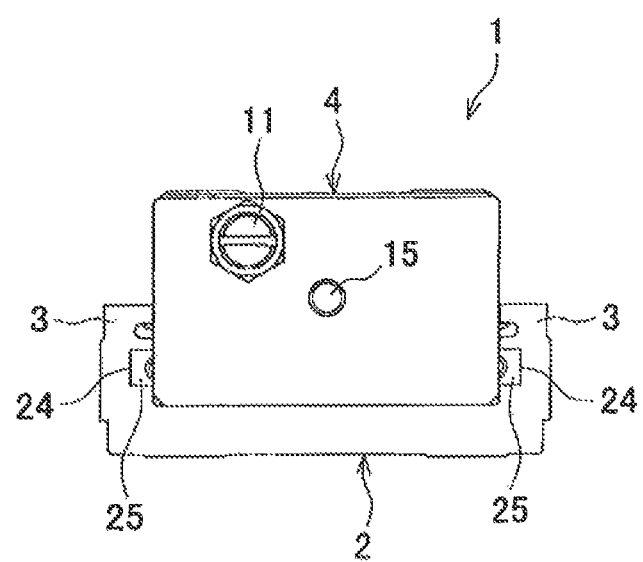
FIG. 3 is a left side view of a magnet-type rodless cylinder.

Below, embodiments of the present invention will be explained with reference to the drawings. FIG. 1 is a front view which shows one example of a magnet-type rodless cylinder, FIG. 2 is a plan view of the same, and FIG. 3 is a left side view. A magnet-type rodless cylinder (below simply called a "rodless cylinder") 1 includes a base 2 with a U-shaped cross-section which is provided with a left and right pair of side wall parts 3, 3, a slide member 4 which is arranged between the side wall parts 3, 3 of the base 2 and can slide along the base 2, and guide mechanisms 5, 5 which are provided between the side wall parts 3, 3 and the slide member 4.

Figure 5:
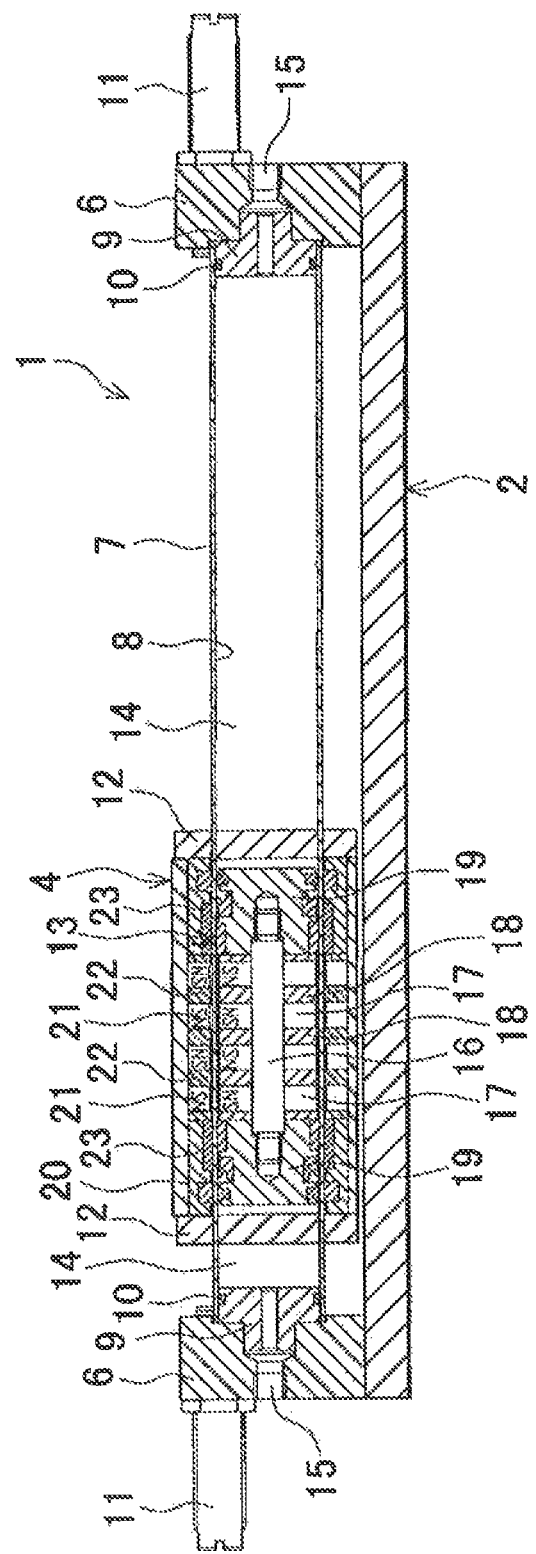
FIG. 5 is a cross-sectional view along the line DD of FIG. 2.

At the two ends of the base 2 in the longitudinal direction, a pair of end caps 6, 6 are provided. Between the facing surfaces of the end caps 6, 6, a cylinder tube 7 which is comprised of a nonmagnetic material is laid. Over the cylinder tube 7, a slide member 4 which is comprised of a nonmagnetic material is run. The cylinder tube 7, as shown in FIGS. 4 and 5, has a circular cross-sectional shape and forms inside it a circular cross-section cylindrical bore 8. The two end parts of the cylindrical bore 8 are air-tightly fit with engagement members 9 which are attached to the end caps 6, 6 through O-rings 10. Reference notations 11, 11 are shock absorbers which are provided at the end caps 6 and which abut against the end plates 12, 12 of the slide member 4 in the front and back of the slide direction at the stroke ends so as to absorb shock. Note that, the end plates 12, 12 are made of metal (here, iron) and are fastened to the side members 4 by bolts 12a, 12a.

Further, inside the cylindrical bore 8 of the cylinder tube 7, a piston 13 is housed to be able to move back and forth in the cylinder tube 7 in the axial direction and divides the cylindrical bore 8 into cylinder chambers 14, 14 at the front and back in the axial direction. The end caps 6 are formed with feed/eject ports 15, 15 which are communicated with the cylinder chambers 14 through passages formed at the axial centers of the engagement members 9.

Furthermore, the piston 13 is constructed from a center piston shaft 16 around which donut-shaped inside magnets 17, 17 . . . and similar shaped yokes 18, 18 . . . are alternately fit. The inside magnets 17 and yokes 18 are clamped and fastened from the two ends by the piston ends 19, 19. The poles of the inside magnets 17 are arranged as SN, NS, SN, NS so that the same poles face each other in the axial direction.

On the other hand, at the portion of the slide member 4 passing over the cylinder tube 7, a circular cross-section bore 20 one size larger than the cylinder tube 7 is provided. Inside this bore 20, donut-shaped outside magnets 21, 21 . . . which surround the circumference of the cylinder tube and similarly shaped yokes 22, 22 . . . are alternately arranged in the axial direction. By fastening end plates 12, 12 through tubular spacers 23, 23 which are arranged at the two ends of these outside magnets 21, 21 . . . and yokes 22, 22 . . . , the outside magnets 21 and yokes 22 are held inside the bore 20. The poles of the outside magnets 21 are arranged as NS, SN, NS, SN so that the same poles face each other in the axial direction and different poles face the poles of the inside magnets 17 of the piston 13. Accordingly, the piston 13 and the slide member 4 are integrally joined over the cylinder tube 7 by the magnetic coupling force between the inside magnets 17 and the outside magnets 21.

Next, the guide mechanisms 5 will be explained. However, side wall parts 3, 3 both have the same structures, so mainly one side will be explained. First, at the inside surface of each side wall part 3 of the base 2, as shown in FIGS. 2 and 4, an outer groove 24 parallel with the cylinder tube 7 is formed over the entire length. Inside the outer groove 24, an outer rail 25 is press fit or bonded. At the inner surface side of this outer rail 25 (slide member 4 side), a semicircular cross-section outside rolling groove 26 is provided across the entire length.

On the other hand, at the side surface of the slide member 4 which faces the outer groove 24, an inner groove 27 parallel with the outer groove 24 is formed. Inside of this inner groove 27, an inner rail 28 is press fit or bonded. This inner rail 28 is smaller in thickness in the left-right direction compared with the outer rail 25. At the outer surface side (side wall part 3 side), a semicircular cross-section inside rolling groove 29 is provided over the entire length.

Furthermore, at the inside from each inner rail 28 at the slide member 4, a bore 31 is formed parallel with the inner rail 28 and a tubular member 32 is housed in the bore 31. At the front and back of this tubular member 32, plastic return caps 33 which have U-shaped connecting paths 34 which connect the space between the outer rail 25 and inner rail 28 and the tubular member 32 are fastened at the insides of the end plates 12, 12 by screwing them in. Accordingly, by the space between the outer rail 25 and inner rail 28, the tubular member 32, and the connecting paths 34 of the return caps 33, an endless circulating path 35 which is formed long in the front-back direction is formed. Inside this circulating path 35, rollers constituted by a plurality of steel balls 36, 36 . . . are held. Reference numerals 37, 37 are lubrication members constituted as wipers which are provided at the end plates 12 and which fit at their front ends into the outside rolling grooves 26 of the outer rails 25.

In the above configured rodless cylinder 1, the base 2 is fastened to a mounting member for use. Further, in the state with the top surface of the slide member 4 carrying a workpiece or other object, if feeding compressed air from either of the feed/eject ports 15, 15 of the left and right end caps 6, 6, the piston 13 moves linearly through the cylindrical bore in the cylinder tube 7 in the axial direction. This being so, the slide member 4 which is integrally joined with the piston 13 by the magnetic coupling force between the inside magnets 17 and the outside magnets 21 tracks it and moves along the cylinder tube 7 back and forth in the axial direction.

At the time of back and forth movement of this slide member 4, at the guide mechanisms 5, 5, the steel balls 36, 36 roll between the outer rails 25 and the inner rails 28 while circulating through the circulating paths 35, so the inner rails 28 are guided to move along the outer rails 25 through the steel balls 36. Accordingly, the slide member 4 moves back and forth by a stable posture.

Here, when the slide member 4 reaches the stroke ends, the metal end plates 12 directly abut against the shock absorbers 11, so the bolts 12a are not liable to loosen. Further, the return caps 33, 33 which are positioned at the two ends of the circulating paths 35 are arranged at the insides of the end plates 12, so impact at the end plates 12 is hard to be transmitted to the return caps 33. Accordingly, the circulating paths 35 are maintained.

In this way, according to the rodless cylinder 1 of the above embodiment, by attaching metal end plates 12 to the front and back ends of the slide member 4 in the slide direction and arranging inside members forming the connecting paths 34 (return caps 33) at the insides of the end plates 12 to thereby make the end plates 12 directly abut against the shock absorbers 11 at the stroke ends, compared with the prior art, the total length of the slide member 4 becomes shorter. Further, there is no need to arrange shock absorbers 11 at the end sides of the end caps so as to correspond with the bolts 12a which attach the end plates 12 to the slide member 4, so this leads to a reduced size of the rodless cylinder 1 as a whole. Further, at the time of maintenance work at the inside of the slide member 4, even if removing the end plates 12, the steel balls 36, 36 . . . will not fall out from the circulating paths 35 and the piston 13, scraper, etc. can be easily maintained.

In particular, here, the end plates 12 are provided with the wipers 37 which lubricate the outside rolling grooves 26, so the total length of the slide member 4 does not become longer.

Note that, in the above embodiment, the outside rolling grooves and the inside rolling grooves are formed at the outer rails and the inner rails, but it is also possible to eliminate these rails and directly form the outside rolling grooves and the inside rolling grooves at the side wall parts and the slide member. Further, tubular members are used to form the guide paths, but it is also possible to eliminate the tubular members and use the bores as they are as the guide paths. Furthermore, it is not necessary to provide wipers between the end plates and return caps.

Further, in the rodless cylinder of the above embodiment, a structure has been explained where the piston is made to advance and retract inside a single cylindrical bore of a slide tube with a circular cross-section so as to make it magnetically couple with the slide member, but the invention is not limited to this. For example, the present invention can also be applied to a rodless cylinder which forms a pair of cylindrical bores inside a slide tube with an elliptical cross section and houses pistons in the cylindrical bores to be magnetically coupled with the slide member.

Note that, the present invention has been explained in detail based on specific embodiments, but a person skilled in the art could make various changes, corrections, etc. without, departing from the claims and concepts of the present invention.

REFERENCE SIGNS LIST 1 magnet-type rodless cylinder
2 base
3 side wall part
4 slide member
5 guide mechanism
6 end cap
7 cylinder tube
8 cylindrical bore
12 end plate
13 piston
14 cylinder chamber
17 inside magnet
21 outside magnet
24 outer groove
25 outer rail
26 outside rolling groove
27 inner groove
28 inner rail
29 inside rolling groove
32 tubular member
33 return cap
34 connecting path
35 circulating path
36 steel ball

The invention claimed is:

1. A magnet-type rodless cylinder comprising:
a base with a U-shaped cross-section which is provided with a left and right pair of side wall parts;
a cylinder tube which holds a piston, the cylinder tube being provided in said base parallel to said side wall parts of said base;
a slide member comprising a body and a pair of metal end plates which are attached to and in contact with both ends of the body in the slide direction, wherein the slide member can slide along said cylinder tube and is provided at an outer circumferential surface of said cylinder tube, the slide member being integrally joined with said piston by a magnetic coupling force and can move along with said piston;
a pair of guide mechanisms for said slide member which are provided between said pair of side wall parts and said slide member; and
shock absorbers which absorb movement of said slide member,
wherein each of said guide mechanisms includes an outside rolling groove which is provided in said side wall part and which is parallel with said cylinder tube, an inside rolling groove which is provided in the body of said slide member facing the outside rolling groove, a guide path which is parallel with said cylinder tube and provided at the body of said slide member, a U-shaped pair of connecting paths which connect the space between said outside rolling groove and said inside rolling groove and said guide path, and a plurality of rollers which can roll inside an endless circulating path which is formed by the space between said outside rolling groove and said inside rolling groove, said guide path, and said connecting paths, and a pair of inside members each defining said connecting path and disposed at insides of the metal end plates,
wherein the metal end plates of said slide member directly abut against said shock absorbers at the stroke ends of said slide member,
wherein lubricating members which lubricate said outside rolling grooves are attached to inner surfaces of said metal end plates, and
wherein the U-shaped pair of connecting paths are defined only in the pair of inside members.

* * * * *